United States Patent [19]
Affolter et al.

[11] Patent Number: 6,046,370
[45] Date of Patent: Apr. 4, 2000

[54] PROCESS FOR THE TREATMENT OF USED RUBBER AND PLASTICS

[75] Inventors: Jean Affolter, Saint-Prex; Richard Bovey, Lausanne; Jean-Pierre Vuille, Renens, all of Switzerland

[73] Assignee: Alcyon S.A., Switzerland

[21] Appl. No.: 09/196,715

[22] Filed: Nov. 20, 1998

[30] Foreign Application Priority Data

Dec. 22, 1997 [EP] European Pat. Off. .............. 97122609

[51] Int. Cl.[7] .............................. C07C 1/00; C10B 53/00
[52] U.S. Cl. ................... 585/241; 201/25; 201/13
[58] Field of Search ................... 585/241; 201/2, 201/5, 25, 13, 22

[56] References Cited

U.S. PATENT DOCUMENTS 4,250,158  2/1981  Solbakken et al. .................... 423/449
4,740,270  4/1988  Roy ..................................... 201/35

FOREIGN PATENT DOCUMENTS 0 003 803  of 1979  European Pat. Off. .

*Primary Examiner*—Walter D. Griffin
*Attorney, Agent, or Firm*—Anthony J. Casella; Gerald E. Hespos

[57] ABSTRACT

The process aims treatment of used rubber and plastics such as vehicle tires, car fluff (plastic and rubber residues from shredded automobiles), and RDF (Refuse Derived Fuel). A vacuum pyrolysis of cuttings of said rubber and plastics is made in a reactor to yield a non condensable fraction of combustible gas, oil, and a carbonaceous solid residue. A portion of the carbonaceous solid residue is mechanically mixed in the reactor to the rubber and plastics cuttings before and during pyrolysis thereof.

9 Claims, No Drawings

PROCESS FOR THE TREATMENT OF USED RUBBER AND PLASTICS

This invention relates to a process for the treatment of used rubber and plastics by vacuum pyrolysis of cuttings of said used rubber and plastics to yield a non condensable fraction of combustible gas, oil, and a carbonaceous solid residue.

BACKGROUND OF THE INVENTION

The treatment of used rubber and plastics such as vehicle tires, car fluff (plastic and rubber residues from shredded automobiles), and RDF (Refuse Derived Fuel) is a major environmental problem.

Vacuum pyrolysis of rubber and plastics cuttings is state of the art. For example, U.S. Pat. No. 4,740,270 describes a process for the vacuum pyrolysis of scrap tires in which tire cuttings are moved in a multi-tray reactor with conventional transportation system of the tire cuttings from an upper to a lower tray for subjecting them to pyrolysis. The tire cuttings are shifted from the top tray to the bottom tray along a temperature gradient starting at 200° C. and peaking at 500° C., the tire cuttings being thus heated up continuously while moving down. The process aims a high oil yield against non condensable gas, and to achieve that result, the document recommends a subatmospheric pressure of less than 35 mm Hg. It is known that rubber undergoes a softening stage before pyrolysis sets on from 200° C. onwards. Softened tire cuttings are sticky and prone to fix to any available surface, thereby choking the equipment. In the multi-tray reactor described, the tire cuttings will stick in one stand, most likely always the same tray, as long as the speed of transportation, the temperature gradient, and the heat transfer coefficient are maintained constant. The rubber cuttings may therefore choke a tray, whereas the transport of the cuttings is impaired and the pyrolysis gas is trapped. An overpressure is created in the reactor which may explode. Furthermore, to maintain the aforesaid subatmospheric pressure of 35 mm Hg, the reaction rate must be carefully controlled and kept low, which implies a long residence time of the materials in the reactor and therefore the reactor must be large. Still further, large reactors are expensive, and the lower the pressure in the reactor the more powerful and expensive the vacuum pump. All these adverse features make the equipment expensive and hazardous.

It is an object of this invention to overcome these drawbacks by means of a process for the treatment of used rubber and plastics by vacuum pyrolysis which is safe, efficient, and economical.

DETAILED DESCRIPTION OF THE INVENTION

Accordingly, the invention provides for a process for the treatment of used rubber and plastics by vacuum pyrolysis of cuttings of said used rubber and plastics to yield a non condensable fraction of combustible gas, oil, and a carbonaceous solid residue, comprising the step of mechanically mixing in a reactor at least a portion of said carbonaceous solid residue to said rubber and plastics cuttings before and during pyrolysis thereof.

The mechanical mixing ensures a homogeneous solid mass, a high transfer of heat from a reactor shell into the solid product, and a reduction of the reaction time. The carbonaceous solid residue is a fine powder which coats the rubber and plastics cuttings, thereby preventing them from sticking to available surfaces when undergoing the softening stage. Further, the carbonaceous solid residue enhances the heat transfer and contributes to reduce the reaction time. The carbonaceous solid residue acts as a thermal buffer and levels off temperature variations, which is particularly advantageous where a batch procedure is used. The process is safe. It is economical as it allows using a smaller reactor volume. It has been examined if the carbonaceous solid residue had some adverse catalytic effect, i.e., if it would boost the conversion of pyrolysis oil into non condensable gas; it has been found that the carbonaceous solid residue, which adsorbs the oil, behaves fairly neutral, and no decrease of oil yield was observed by comparison to a process making no use of the carbonaceous solid residue mixing.

Typically, the pyrolysis of the rubber and plastics cuttings is made by batches of said rubber and plastics cuttings loaded successively in the reactor wherein each batch loaded in the reactor is mechanically mixed in the reactor before and during pyrolysis thereof to a portion of said carbonaceous solid residue as resulting from pyrolysis of a previous batch.

Preferably, a further step is to remove from the reactor after pyrolysis only a part of said carbonaceous solid residue.

Still a further step is that the weight of said part of the carbonaceous solid residue removed from the reactor after pyrolysis of a batch is smaller than that of a next batch and adjusted in a way that at the end of pyrolysis of said next batch a substantially constant amount of carbonaceous solid residue is yielded.

Preferably, said rubber and plastics cuttings are mixed with said carbonaceous solid residue in a proportion of one part weight of rubber and plastics cuttings to three to one fifth part weight of said carbonaceous solid residue.

Preferably, the used rubber and plastics are shredded to 2×2 inches cuttings or lesser size to make use of the standard cuttings size afforded by state of the art shredders. And said used rubber and plastics cuttings may be shredded without previous separation of cords and steel threads to avoid the expensive separation operation; the cords are transformed into a graphite powder which mixes well with the carbon black contained in the rubber and the steel threads may be easily removed by a magnetic separator after pyrolysis.

Preferably, the pressure in the reactor shell is reduced to 0.5 to 0.9 bar.

In an advantageous configuration, the reactor comprises a reactor shell heated from the outside, either by electricity or hot gas, and the reactor shell is heated up to a temperature range from 450° C. to 550° C. Pyrolysis temperature is in the range of 350° C. to 450° C.

Typically, the process yields 50 to 55% oil, 3 to 8% non condensable combustible gas, and the balance of matter is the carbonaceous solid residue containing carbon black, graphite from pyrolysed cords, zinc oxide, sulfur, silicates and other mineral substances, and steel threads. The yields depend on the quality of the pyrolysed materials and possible uses of the resulting products are state of the art of recycling.

What is claimed is:

1. A process for the treatment of used rubber and plastics by vacuum pyrolysis of cuttings of said used rubber and plastics in a reactor to yield a non-condensable fraction of combustible gas, oil, and a carbonaceous solid residue, comprising the steps of removing from the reactor after pyrolysis only a part of said carbonaceous solid residue, wherein pyrolysis of the rubber and plastics cuttings is made by batches of said rubber and plastics cuttings loaded successively into the reactor, with each batch loaded into the reactor being mechanically mixed in the reactor before and during pyrolysis thereof to said carbonaceous solid residue remaining in the reactor as a result of said part removing of the carbonaceous solid residue after pyrolysis of a previous batch.

2. A process according to claim 1, wherein the weight of said part of the carbonaceous solid residue removed from the reactor after pyrolysis of a batch is smaller than that of a next batch and adjusted in a way that at the end of pyrolysis of said next batch a substantially constant amount of carbonaceous solid residue is yielded.

3. A process according to claim 1, wherein said rubber and plastics cuttings are mixed with said carbonaceous solid residue in a proportion of one part weight of rubber and plastics cuttings to three to one fifth part weight of said carbonaceous solid residue.

4. A process according to claim 1, wherein the used rubber and plastics are shredded to 2×2 inches cuttings or lesser size.

5. A process according to claim 1, wherein the used rubber and plastics cuttings are shredded without previous separation of cords and steel threads.

6. A process according to claim 1, wherein the pressure in the reactor is reduced to 0.5 to 0.9 bar.

7. A process according to claim 1, wherein the reactor comprises a reactor shell heated from the outside.

8. A process according to claim 7, wherein the reactor shell is heated up to a temperature range from 450° C. to 550° C.

9. A process according to claim 1, wherein the pyrolysis temperature is in the range of 350° C. to 450° C.

* * * * *